United States Patent [19]

Su

[11] Patent Number: 5,504,698

[45] Date of Patent: Apr. 2, 1996

[54] COMPACT DUAL FUNCTION ADDER

[75] Inventor: Yi-Feng Su, Cupertino, Calif.

[73] Assignee: Silicon Graphics, Inc., Mountain View, Calif.

[21] Appl. No.: 245,200

[22] Filed: May 17, 1994

[51] Int. Cl.$^6$ .................................................... G06F 7/50
[52] U.S. Cl. .................. 364/768; 364/770; 364/786; 364/787
[58] Field of Search .................................. 364/736, 768, 364/770, 784, 786, 787, 788

[56] References Cited

U.S. PATENT DOCUMENTS

| | | | |
|---|---|---|---|
| 4,224,668 | 9/1980 | Peters et al. | 395/775 |
| 4,309,753 | 1/1982 | Negi et al. | 395/375 |
| 4,723,258 | 2/1988 | Tanaka et al. | 377/111 |
| 4,761,760 | 8/1988 | Tomoji | 364/788 |
| 5,027,310 | 6/1991 | Dalrymple | 364/770 |

*Primary Examiner*—Roy N. Envall, Jr.
*Assistant Examiner*—Chuong D. Ngo

[57] ABSTRACT

A compact dual function adder circuit for providing both an addition operation for adding an input m-bit word to an input n-bit word, wherein m<n, and an increment operation for incrementing the input n-bit word, the dual function adder comprising a n-bit incrementer circuit, wherein the n-bit incrementer includes a first m-bit incrementer and a second n−m)-bit incrementer to provide a n-bit incrementer output sum. The n-bit incrementer output sum comprises an m-bit incrementer output sum from the m-bit incrementer and a n−m)-bit incrementer output sum from the n−m)-bit incrementer. The compact dual function adder also comprises a combined adder circuit, the combined adder comprising a first m-bit full-adder, a n−m)-bit decrementer, and an adder select logic circuit, wherein the adder select logic receives an adder carryout bit from the m-bit full-adder and a bit<15> of the input m-bit word to control an operation of the adder select logic to generate either an increment operation, a decrement operation, or a bypass operation.

21 Claims, 10 Drawing Sheets

INC1:

INC1B:

DEC1B

COMPACT DUAL FUNCTION ADDER

FIELD OF THE INVENTION

The present invention relates generally to full-adder circuits.

BACKGROUND

Prior art microprocessors commonly implement a y-bit full-adder ("FA") as part of an execution unit to generate a y-bit branch address during an address branch instruction operation. Additionally, the execution unit also includes a y-bit incrementer to operate as a program counter ("PC") for generating a next y-bit PC address as a next execution address. For example, as illustrated in FIG. 1, a 44-bit FA 20 receives an input 44-bit current PC 31, Current_PC[43 . . . 0], which is added to a 44-bit sign extended offset 22, Ext_Offset[43 . . . 0], to generate an output 44-bit branch address 24, Branch_Addr[43 . . . 0]. An adder carryout bit 23, Addr_CO, is also provided as an output of the FA 20 to provide overflow information. Sign extended offset 22 typically comprises a 16-bit word offset portion comprising input bits Ext_Offset[15 . . . 0], and a 28bit word sign extended portion comprising Ext_Offset[43 . . . 16]. The remaining 28 bits, Ext_Offset [43 . . . 16], are typically set to correspond to a logical value of bit Ext_Offset <15>, such that, e.g., if Ext_Offset<15>is equivalent to a logical "1", every bit of the set of bits Ext_Offset[43 . . . 16] is set equivalent to a logical "1", and if Ext_Offset<15>is equivalent to a logical "0", every bit of the set of bits Ext_Offset[43 . . . 16] is set equivalent to a logical "0"to thereby provide a full 44-bit word to an input of the 44-bit FA 20. Incrementer 30 operates as a 44-bit program counter to increment a 44-bit input PC 31, Current_PC[43 . . . 0], and to provide a 44-bit output PC 32, Next_PC[43 . . . 0], together with an output increment carryout bit 33.

A y-bit full adder, a y-bit incrementer (and a y-bit decrementer) are well known basic circuits commonly used in the art of circuit design, and it is also well known that, of these circuits, the full adders are slower and more complicated and thus require more real estate to implement on an integrated circuit than a basic incrementer or a decrementer circuit. However, because advanced microprocessor are increasingly designed with more functions, while still required to minimize real estate, there is therefore a need to provide an efficient means to include the functionality of both the full-adder circuit and the incrementer, while reducing the real estate consumption to provide these combined functions.

SUMMARY OF THE INVENTION

A compact dual function adder circuit is provided which couples an incrementer circuit with a combined adder circuit to generate an addition operation for adding an input m-bit word to an input n-bit word, wherein m<n, and an increment operation for incrementing the input n-bit word. The dual function adder comprises a n-bit incrementer circuit, the n-bit incrementer including a first m-bit incrementer and a second n–m)-bit incrementer to provide a n-bit incrementer output sum. The n-bit incrementer output sum comprises an m-bit incrementer output sum from the m-bit incrementer and a n–m)-bit incrementer output sum from the (n–m)-bit incrementer. The dual function adder also comprises a combined adder circuit, the combined adder comprising a first m-bit full-adder, a (n–m)-bit decrementer, and an adder select logic circuit, wherein the adder select logic receives an adder carryout bit from the m-bit full-adder and a bit<15>of the input m-bit word to control an operation of the adder select logic to generate either an increment operation, a decrement operation, or a bypass operation.

DETAILED DESCRIPTION OF THE PREFERRED EMBODIMENTS.

Figure 1:
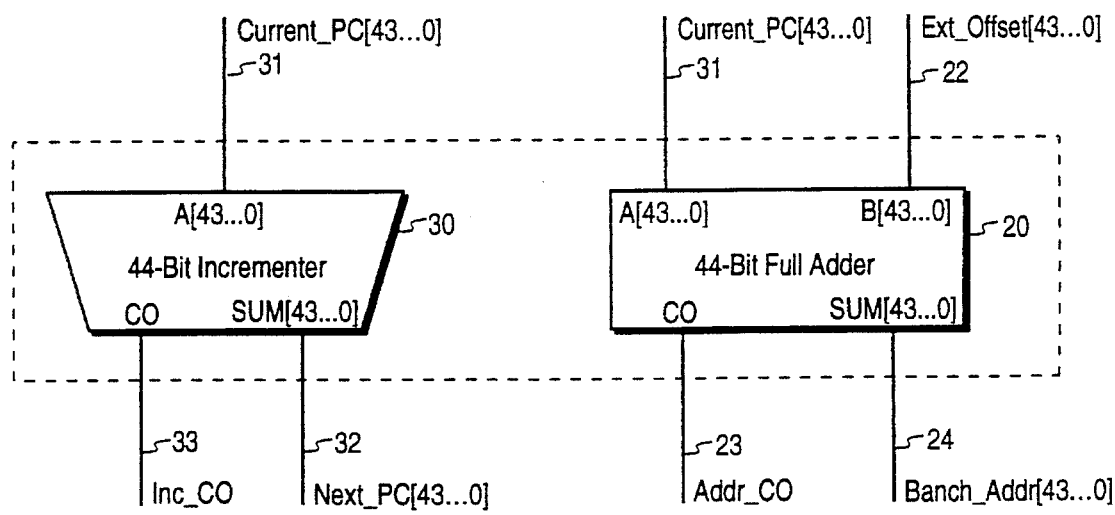
FIG. 1 illustrates a typical block diagram of a program counter incrementer and an address branch full adder.
Figure 2:
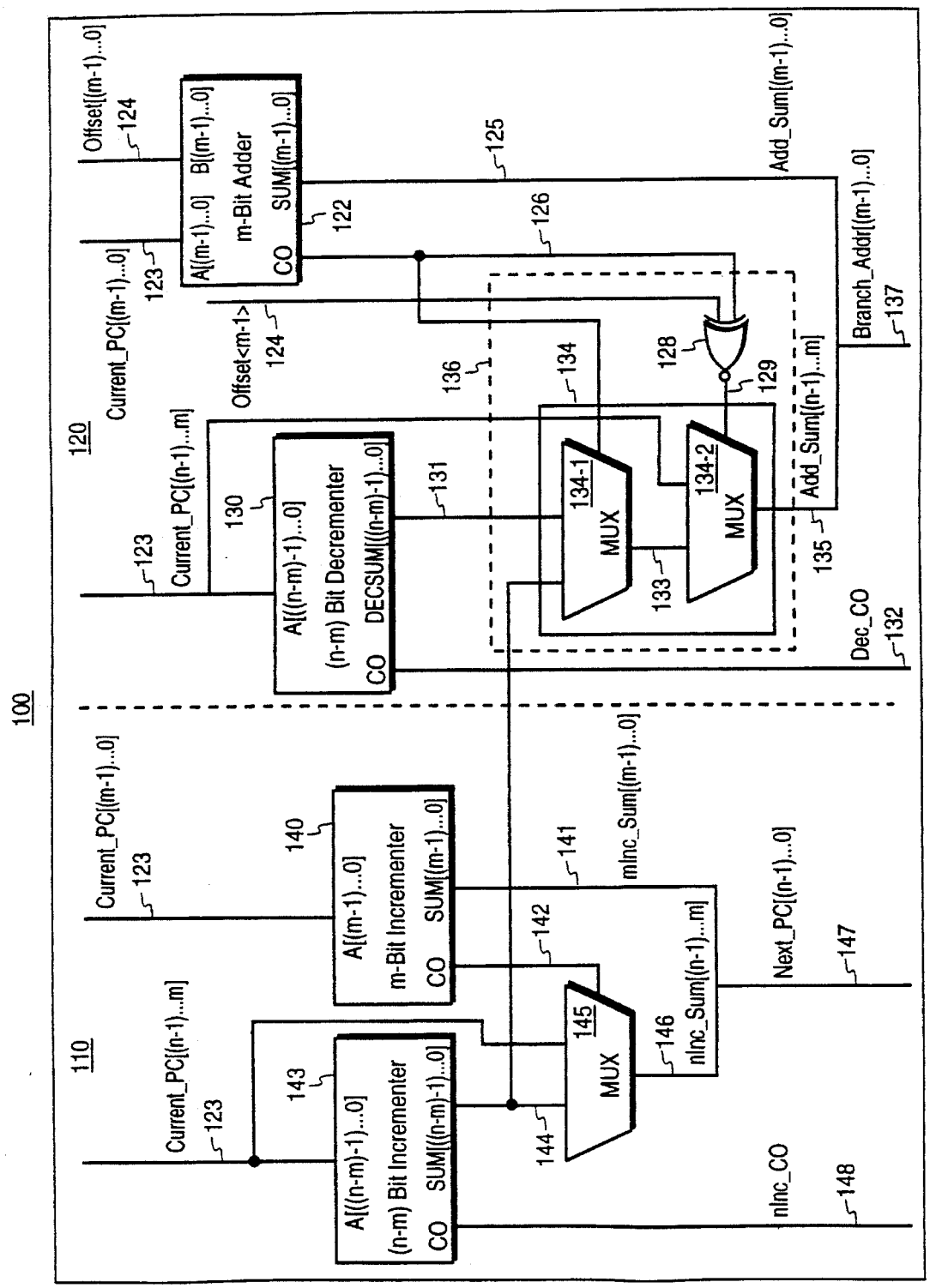
FIG. 2 illustrates a block diagram of a dual function adder provided in accordance with the principles of this invention.

FIG. 2 illustrates a compact dual function adder provided in accordance with the principles of this invention to generate both an addition operation for adding an input m-bit word to an input n-bit word, wherein m<n, and an increment operation for incrementing the input n-bit word. Dual function adder 100 comprises a n-bit incrementer 110, wherein n is equivalent to the n number of bits of an n-bit input PC 123, PC[(n–1) . . . 0], and a combined adder 120 which receives an input m-bit offset word 124, Offset[(m–1) . . . 0], with m being less than n. N-bit incrementer 110 includes a first m-bit incrementer 140, which receives input bits PC[(m–1) . . . 0]of PC address 123 and generates an m-increment output sum 141, mInc_Sum[(m–1) . . . 0] and an m-increment output carryout bit 142, mInc_Co. N-bit incrementer 110 also includes a n–m)-bit incrementer 143, which receives Input bits PC[(n–1) . . . m] of Input PC address 123 and generates a n–m)-bit increment output sum 144, nInc_Sum[(n–1) . . . m], and a n-increment carryout bit 148, nInc_Co. A multiplexor ("MUX")145 is provided which is coupled to receive bits PC[(n–1) . . . m] and n–m)-bit increment output sum 144, wherein MUX 145 is also coupled to receive the m-increment output carryout bit 142 from m-bit incrementer 140 to selectively control MUX 145. Thus, during an increment operation of compact dual adder 100, if carryout bit 142 is a logical "1", an increment operation is thereby selected to provide a first multiplexor input comprising n–m)-bit increment output sum 144 at an n–m)-bit MUX output 146. If carryout bit 142 is a logical "0", no overflow occurred and a bypass operation is selected to thereby provide input bits PC[(n–1) . . . m] from input PC address 123 as n–m)-bit MUX output 146.

The combined adder 120 of dual adder 100 includes an m-bit full-adder 122, which receives input bits PC[(m–1) . . . 0] of n-bit PC address 123 and adds to these bits the m-bit input offset word 124, Offset[(m–1) . . . 0]. M-bit adder 122 generates an m-bit adder sum 125, Add_Sum[(m–1) . . . 0] and an adder carryout bit 126, Add_Co. Combined adder 120 also comprises a (n–m)-bit decrementer 130, which receives the input bits PC[(n–1) . . . m] of input PC address 123 and generates a (n–m-bit decrement output sum 131, Dec_Sum[(n–1) . . . m] and a decrementer carryout bit 132, DecCo.

In the preferred embodiment, combined adder 120 comprises an operation select circuit 136 which includes an XOR gate 128. XOR gate 128 is coupled to m-bit adder 122 to receive adder carryout bit 126, Add_Co, and Offset<m−1>of m-bit offset 124, which together controls a MUX 134 to provide either a (m−n)-bit increment operation, a (m−n)-bit decrement operation, or a bypass operation, wherein bits PC[n−1) . . . m] is provided as output of MUX 134.

In a normal addition operation of n-bit PC address 123 to m-bit Offset 124, wherein m<n, Offset<m−1>indicates whether input offset 124 would be sign extended to comprise either all "0's" or all "1's", which indicates respectively either a positive or a negative signed m-bit offset. Thus, if Offset<m-1> is a logical "0" and adder carryout bit 126 is also a logical "0", a bypass operation is selected to provide input bits PC[(n−1) . . . m]to a n−m)-bit adder MUX output 135, which together with adder output sum 125 generates a n-bit combined output word 137. If while Offset<m-1> is a logical "0" and adder carryout bit 126 is a logical "1", a n−m)-bit increment operation is selected to provide n−m)-bit increment sum 144 to n−m)-bit adder MUX output 135. If, however, Offset<m-1> is a logical "1", a negative offset number is indicated, and if adder carryout bit 126 is a logical "0", a decrement operation is selected to thereby provide n−m)-bit decrement sum 131 to n−m)-bit adder MUX output 135. If both Offset<m1> and adder carryout bit 126 are both logical "1's", a bypass operation with a carryout is selected to thereby provide bits PC[n−1) . . . m] at adder MUX output 135, with decrement carryout bit 132 comprising a logical "1". Table 1 thus summarizes the relationship of bits Add_Co and Offset<m−1> to generate either a (m−n)-bit increment operation, a (m−n)-bit decrement operation, or a bypass operation.

TABLE 1

| Input Bit Offset <m-1> | Adder Carryout Bit (Add_CO) | Selected MUX Operation |
| --- | --- | --- |
| 0 | 0 | Bypass operation to provide input PC[(n-m) . . . m] with decrement carryout = 0 |
| 0 | 1 | Increment operation ("+1") |
| 1 | 0 | Decrement operation ("−1") |
| 1 | 1 | Bypass operation to provide input PC[(n-m . . . m] |

In the preferred embodiment, adder MUX 134 comprises a first adder MUX 134-1 and a second adder MUX 134-2. Adder MUX 134-1 is coupled to n−m)-bit incrementer 143 to receive n−m)-bit increment output sum 144 and to n−m)-bit decrementer 130 to receive n−m)-bit decrement output sum 131. Adder carryout bit 126 is coupled to MUX 134-1 to selectively provide either n−m)-bit increment output sum 144, an increment operation, or n−m)-bit decrement output sum 131, a decrement operation, at a first n−m)-bit adder MUX output 133. Adder MUX 134-2 is coupled to MUX 134-1 to receive first n−m)-bit adder MUX output 133 and input bits PC[(n−1) . . . m] of input PC address 123. MUX 134-2 is also coupled to XOR gate 128 to receive XOR output bit 129, wherein XOR output bit 129 is used to selectively control MUX 134-2 to provide at a second adder MUX output 135 either an incremented sum 144 or a decremented sum 13 1 as provided by n−m)-bit MUX output word 133, or bits PC[(n−1) . . . m]. In an alternative embodiment, it is envisioned that MUX 134 comprises a 3-input multiplexor for selectively providing an increment sum 144, a decrement sum 13 1, or bits PC[n−1) . . . m] as MUX output word 135.

Figure 3:
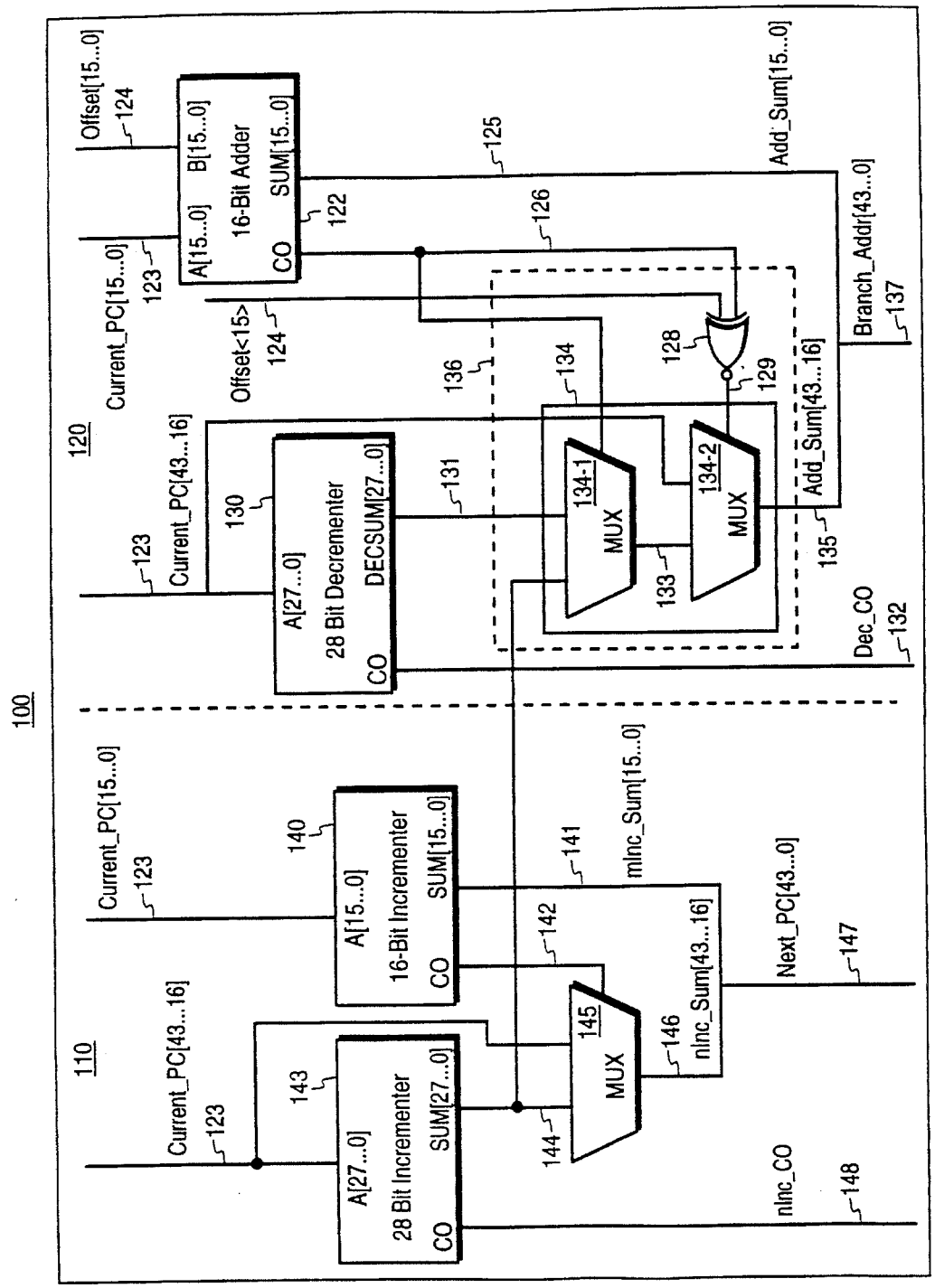
FIGS. 3 illustrates a detailed block diagram of the preferred embodiment of a dual function adder provided in accordance with the principles of this invention.

FIG. 3 illustrates a detailed preferred embodiment of a compact dual function adder 200, wherein, for example, n-bit input PC 123 comprises 44 bits and m-bit input offset 124 comprises 16 bits. Combined adder 200 operates similarly to as described in FIG. 2, wherein variables n=44 and m =16, and full-adder 122 may comprise any typical 16bit full-adder circuit generally known in the art, such as, for example, 16bit full-adder 222 shown in FIG. 4.

Figure 4A:
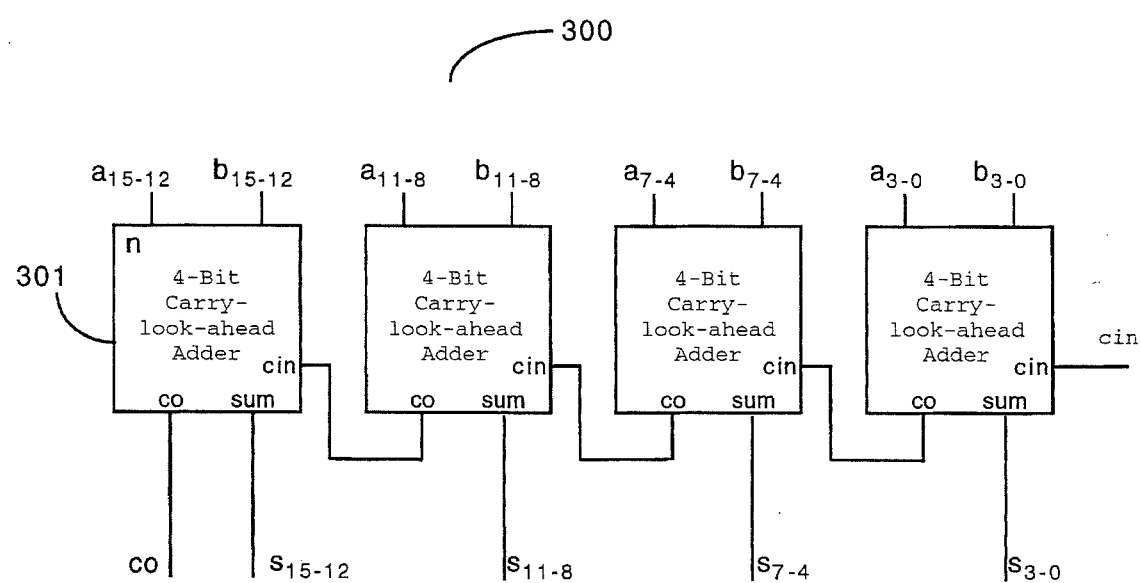
FIGS. 4a–4c illustrate more detailed schematic diagrams of a typical full-adder implementation of FIG. 3.
Figure 4B:
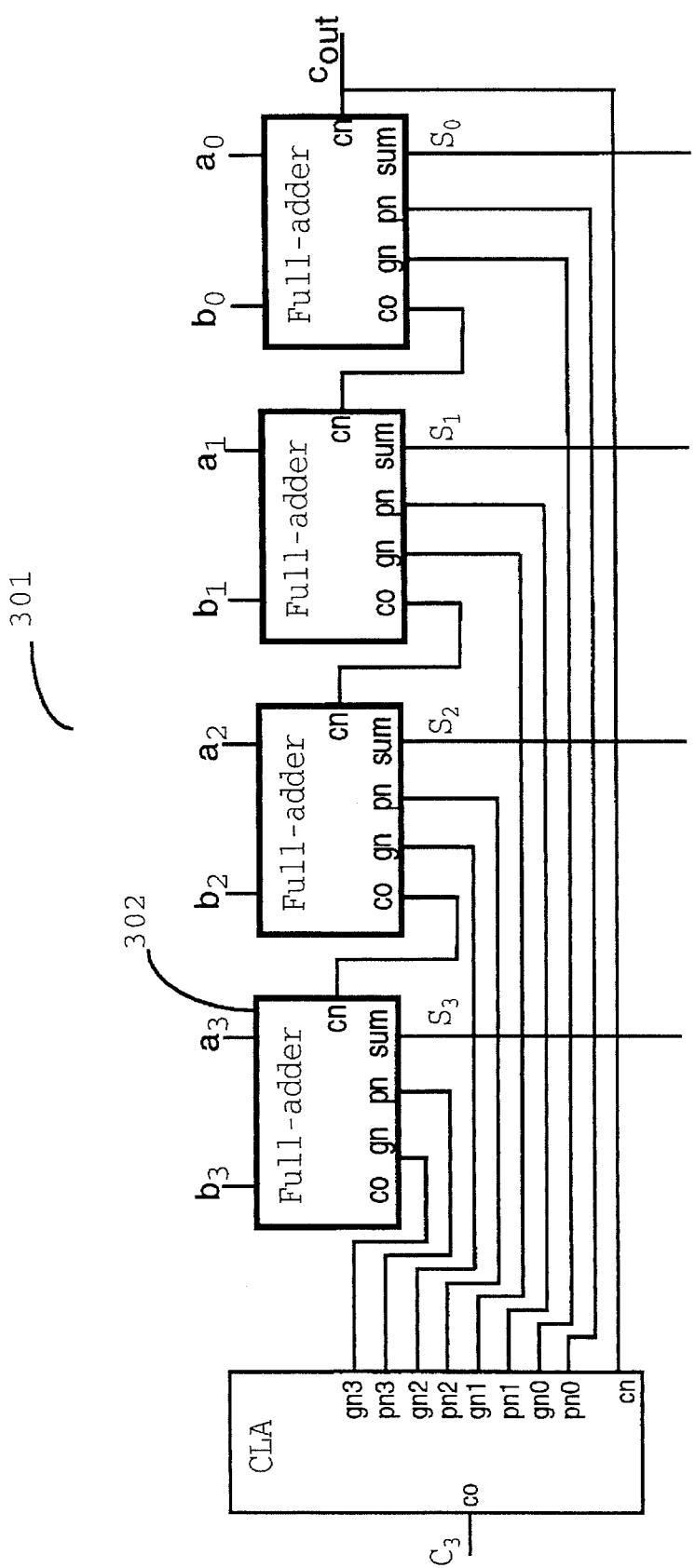
Figure 4C:
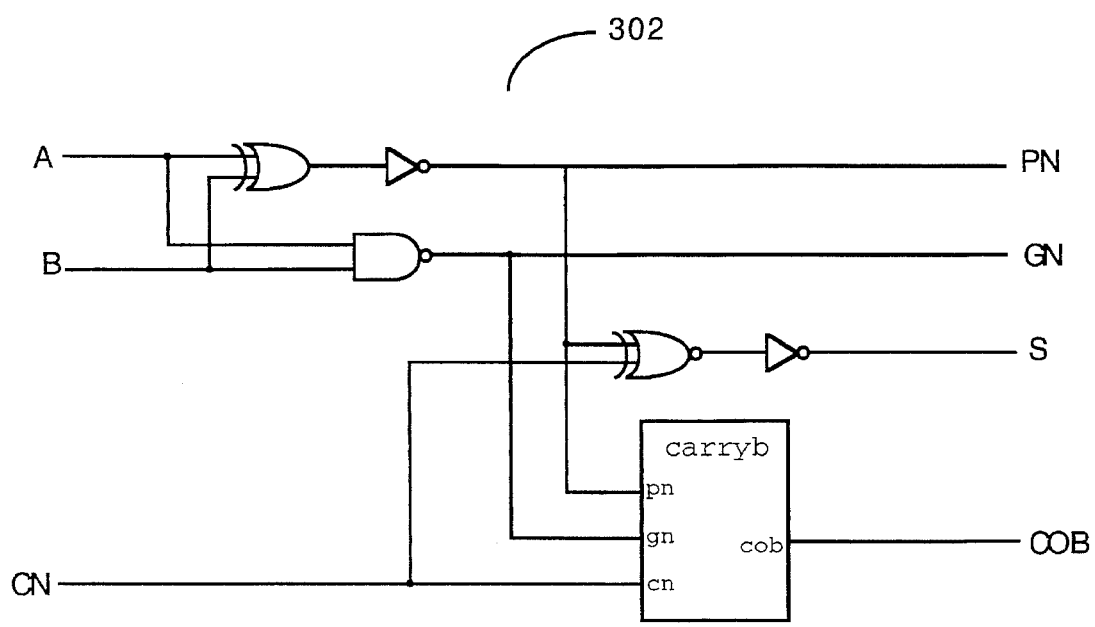
Figure 5A:
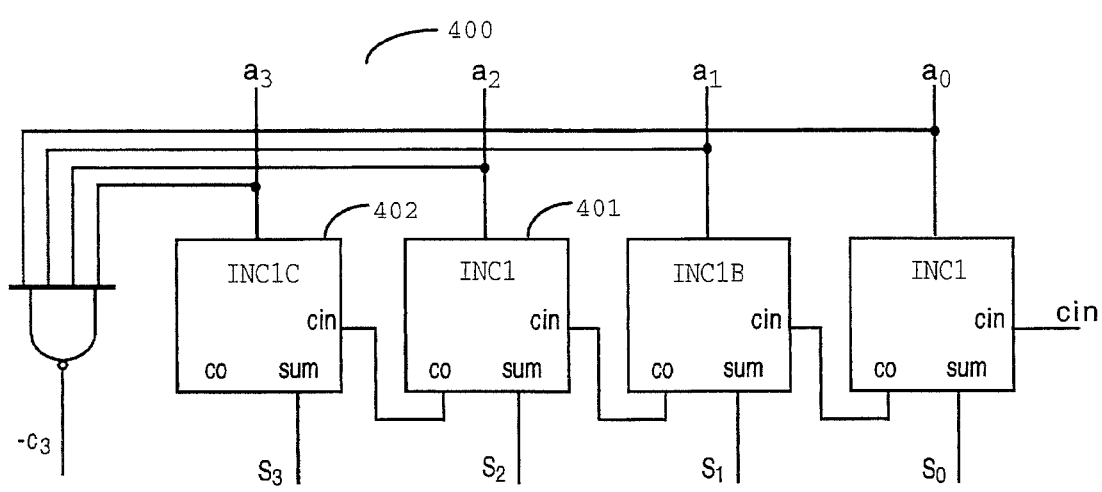
FIGS. 5a–5c illustrate more detailed schematic diagrams of a typical incrementer implementation of FIG. 3.
Figure 5B:
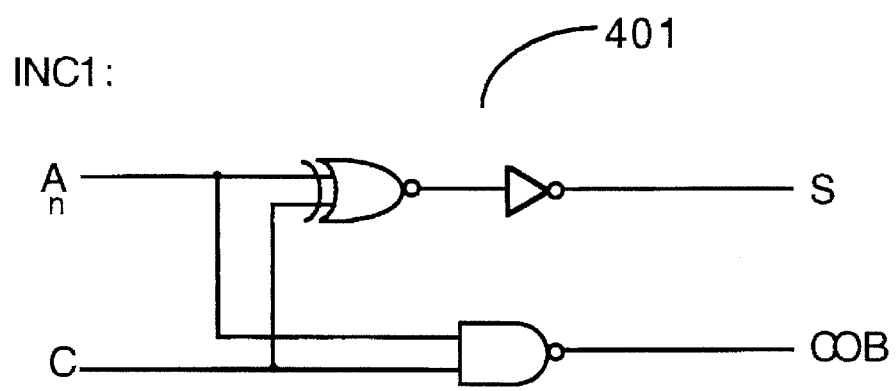
Figure 5C:
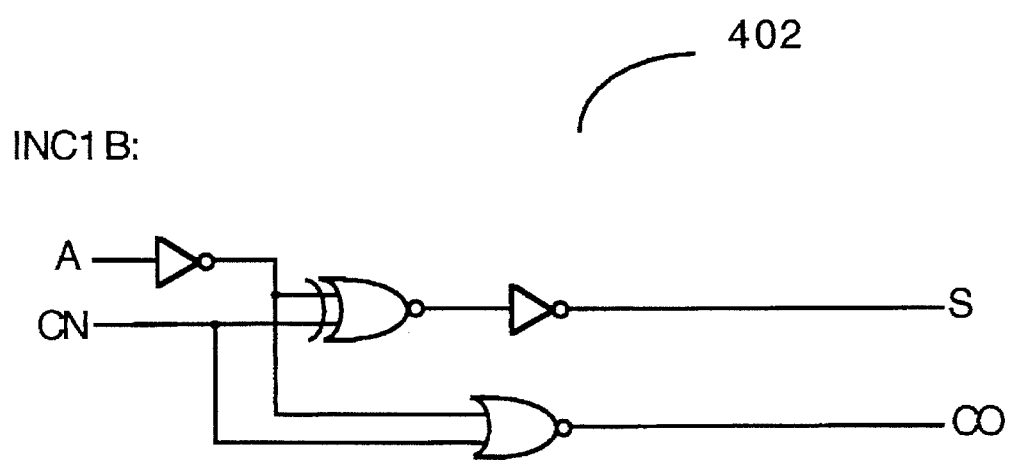

It is envisioned that a y-bit full-adder, such as FA 122 described in FIG. 2 and FIG. 3, may comprise any conventional full-adder, such as comprising a general 16bit full-adder 300 shown in FIG. 4a, or such typical full-adders modified in a commonly known manner to accommodate m-bit full addition operation. FIGS. 4b–4c illustrate more detailed circuit implementation of typical full-adder 300, wherein FIG. 4b is a more detailed block diagram of a 4-bit full-adder unit 301 shown in FIG. 4a, and FIG. 4c illustrates a more detailed circuit schematic of a full-adder unit 302 shown in FIG. 4b Likewise, a y-bit incrementer, such as incrementers 140 and 143, of FIGS. 2 and 3 may comprise any conventional incrementer, such as a 4-bit incrementer 400 illustrated in FIG. 5a. FIG. 5b illustrates a more detailed schematic of an active-low input and active-high output incrementer unit 402 of FIG. 4a, and FIG. 5c illustrates a more detailed schematic of an active-high input and active-low output incrementer unit 401 of FIG. 5a. Incrementer 400 may also be modified in a commonly known manner to accommodate any number of input bits as is needed.

Figure 6A:
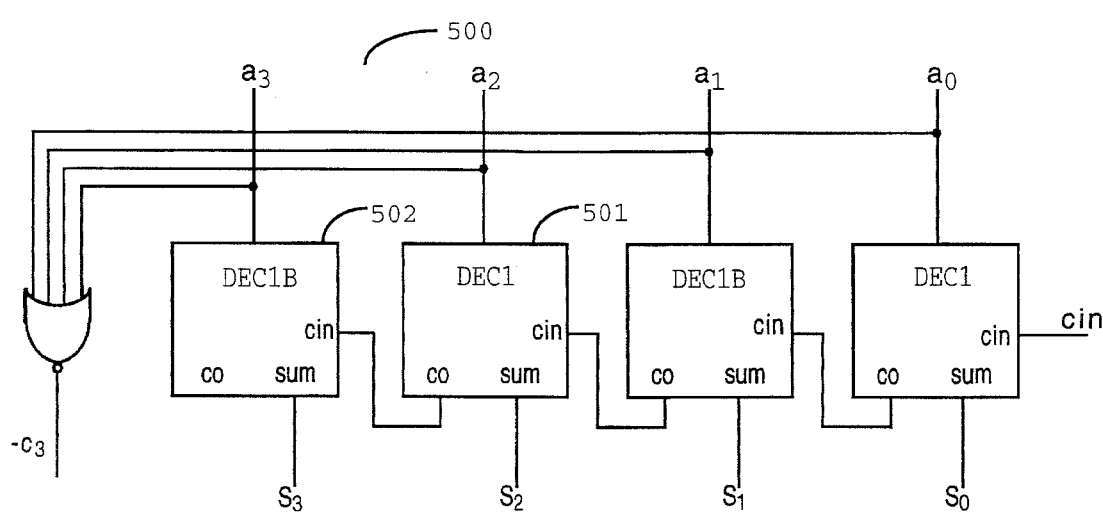
FIGS. 6a–6c illustrate a more detailed schematic diagrams of a typical decrementer implementation of FIG. 3.
Figure 6B:
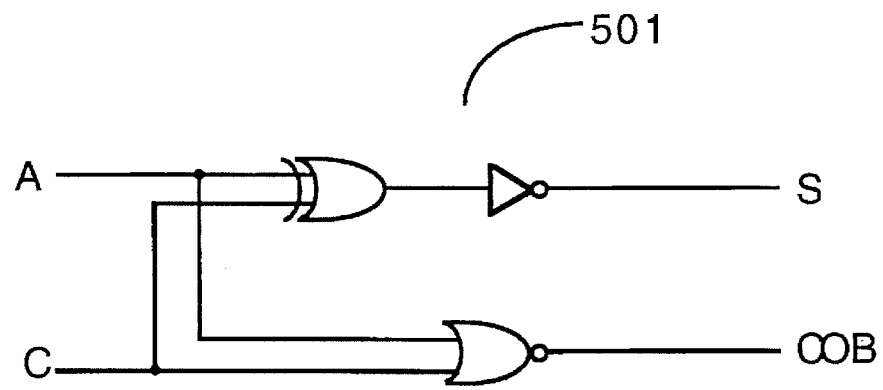
Figure 6C:
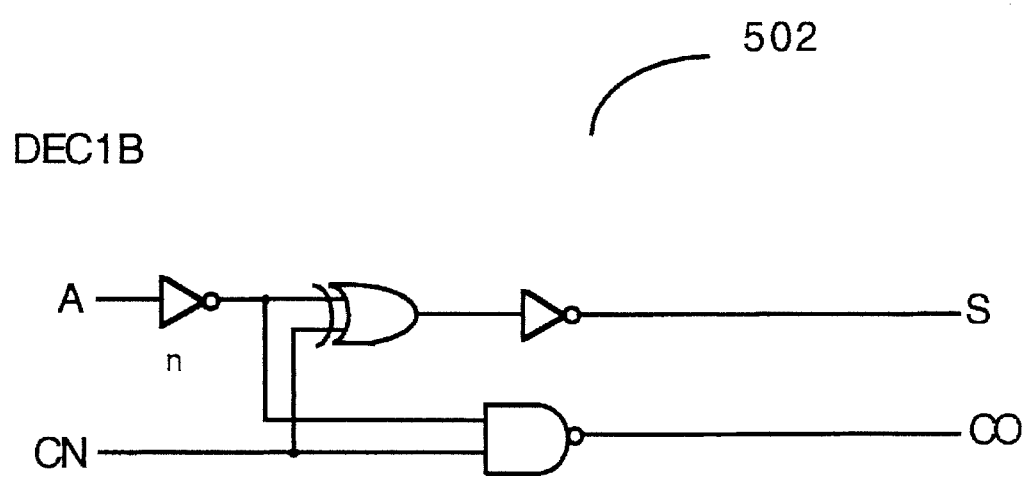

Similarly, a y-bit decrementer, such as incrementers 130 of FIGS. 2 and 3, may comprise any conventional decrementer, such as a 4-bit decrementer 500 illustrated in FIG. 6a. FIG. 5b illustrates a more detailed schematic of an active-low input and active-high output decrementer unit 502 of FIG. 6a, and FIG. 6c illustrates a more detailed schematic of an active-high input and active-low output incrementer unit 501 of FIG. 6a. Decrementer 500 may also be modified in a commonly known manner to accommodate any number of input bits as is needed.

Compact dual function adder 100 therefore provides an efficient circuit for providing both an addition operation needed to generate the next PC and an increment operation needed to generate the next branch address by sharing a common n–m)-bit incrementer to thereby minimize real estate required for such implementation. Conceivably, compact dual function adder 100 can also be used generally with any two input words, wherein the first word is a n-bit input word and a second word is an m-bit input word, and m is typically a sign-extended word and m<n.

Although the invention has been described with respect to specific embodiments, it is envisioned that numerous variations may be made within the scope of the concepts taught in accordance with the inventions.

I claim:

1. A compact dual function adder circuit for providing both an addition operation for adding a first input m-bit word to a second input n-bit word, wherein m<n, and an increment operation for incrementing the second input n-bit word, the dual function adder comprising:

a n-bit incrementer circuit, the n-bit incrementer including a first m-bit incrementer, wherein the m-bit incrementer receives bits<0 . . . (m−1)> of the second input n-bit word to provide an m-bit incrementer output sum, and a second n–m)-bit incrementer, wherein the second n–m)-bit incrementer receives bits <m . . . (n−1)> of the second input n-bit word to provide an n–m)-bit output sum, the m-bit output sum and the n−m)-bit output sum are then coupled to provide a n-bit incrementer output sum a combined adder circuit, the combined adder comprising a first m-bit full-adder, wherein the m-bit full adder receives bits <0 ... (m−1)> of the second input n-bit word and the first input m-bit word to provide an m-bit adder sum, a n−m)-bit decrementer, wherein the n−m)-bit decrementer receives bits<m ... (n−1)> of the second input n-bit word and generates a n−m)-bit decrement output sum, and an adder select logic circuit, wherein the adder select logic is coupled to receive a first select logic input comprising an output of (n−m)-bit incrementer, a second select logic input comprising an output of the n−m)-bit decrementer, a third select logic input comprising the input n-bit word, and a fourth select logic input comprising a two-bit control signal, the two-bit control signal comprising an adder carryout bit from the m-bit full-adder and a bit<m−1> of the first input m-bit word, wherein the adder select logic in response to a state of the adder carryout bit and a state of the bit <m−1> of the first input m-bit word provides at an output of the compact dual function adder either an increment operation, a decrement operation, or a bypass operation.

2. The dual function adder of claim 1 wherein the adder select logic comprises an XOR gate, the XOR gate coupled to receive the adder carryout bit and bit<m−1> of the first input m-bit word, the XOR gate generating a select control signal in response to the state of the adder carryout bit and the state of the bit <m−1 > of the first input m-bit word to provide at the output of the compact dual function adder either the increment operation, the decrement operation, or the bypass operation.

3. The dual function adder of claim 2 wherein the adder select logic further comprises an adder select multiplexor, the adder select multiplexor coupled to the n−m)-bit incrementer, the n−m)-bit decrementer, and the second input n-bit word, the adder select multiplexor also receiving the select control signal from the XOR gate to selectively provide at the output of the dual function adder the increment operation, the decrement operation, or the bypass operation.

4. The dual function adder of claim 3 wherein the adder multiplexor is a 3-input multiplexor, wherein the adder carryout bit is coupled to a select signal of the 3-input multiplexor to selectively provide at the output of the dual function adder the increment operation, the decrement operation, or the bypass operation.

5. The dual function adder of claim 3, wherein the adder select logic further comprises:

wherein if the bit <m−1> of the first input m-bit word is equivalent to a logical "0" and the adder carryout bit is equivalent to a logical "0", a bypass operation is selected and the adder select multiplexor provides the bits<(n−1) ... m> of the second input n-bit word at an output of the combined adder circuit;

wherein if the bit<m−1> of the first input m-bit word is equivalent to a logical "0" and the adder carryout bit is equivalent to a logical "1", an increment operation is selected and the adder select multiplexor provides the n−m)-bit incrementer output sum from the n−m)-bit incrementer at the output of the combined adder circuit; and wherein if the bit <m−1> of the first input m-bit word is equivalent to a logical "1" and the adder carryout bit is equivalent to a logical "0", a decrement operation is selected and the adder select multiplexor provides the n−m)-bit decrement output sum from the n−m)-bit decrementer at the output of the combined adder circuit.

6. The dual function adder of claim 1, wherein the adder select logic further comprises:

wherein if the bit<m−1> of the first input m-bit word is equivalent to a logical "0" and the adder carryout bit is equivalent to a logical "0", a bypass operation is selected;

wherein if the bit<m−1> of the first input m-bit word is equivalent to a logical "0" and the adder carryout bit is equivalent to a logical "1", an increment operation is selected; and wherein if the bit <m−1> of the first input m-bit word is equivalent to a logical "1" and the adder carryout bit is equivalent to a logical "0", a decrement operation is selected.

7. A compact dual function adder circuit for providing both an addition operation for adding a first input m-bit word to a second input n-bit word, wherein m<n, and an increment operation for incrementing the second input n-bit word, the dual function adder comprising:

a n-bit incrementer circuit, said n-bit incrementer including:
  a first m-bit incrementer, wherein the m-bit incrementer receives bits <0 ... (m−1)> of the second input n-bit word to provide an m-bit incrementer output sum, and a second n−m)-bit incrementer, wherein the second n−m)-bit incrementer receives bits <m ... (n−1)> of the second input n-bit word to provide an n−m)-bit output sum, the m-bit output sum and the n−m)-bit output sum are then coupled to provide a n-bit incrementer output sum; and a combined adder circuit, the combined adder including:
  a first m-bit full-adder wherein the m-bit full adder receives bits <0 ... (m−1)> of the second input n-bit word and the first input m-bit word to generate an m-bit adder sum;

a n−m)-bit decrementer wherein the n−m)-bit decrementer receives the second input n-bit word and generates n−m)-bit decrement output sum; and an adder select logic circuit, wherein the adder select logic receives a two-bit control signal, the two-bit control signal including an adder carryout bit from the m-bit full-adder and a bit <m−1> of the first input m-bit word, the adder select logic in response to a state of the adder carryout bit and a state of the bit<m−1> of the first input m-bit word selectively controlling an output of the compact dual function adder to provide either an increment operation by providing the n−m)-bit output sum from the n-bit incrementer, a decrement operation by providing a n−m)-bit decrement sum from the (n−m)-bit decrementer, or a bypass operation by providing bits<(n−1) ... m> of the second input n-bit word together with the m-bit adder sum from the m-bit adder as a combined n-bit adder output word.

8. The dual function adder of claim 7 wherein the adder select logic comprises an adder multiplexor, wherein the adder carryout bit from the m-bit full-adder and the bit<(m−1> of the first input m-bit word are coupled to a select signal input of the adder multiplexor to selectively provide the n−m)-bit adder output sum.

9. The dual function adder of claim 7 wherein the adder select logic comprises:

an XOR gate, the XOR gate coupled to receive the adder carryout bit and bit<m−1> of the first input word, the XOR gate generating a select operation control signal; and an adder multiplexor, wherein the adder carryout bit and the select operation control signal are coupled to a multiplexor select signal input of the adder multiplexor to selectively provide at the output of the compact dual function adder either the increment operation, the decrement operation, or the bypass operation.

10. The dual function adder of claim 8 wherein the adder multiplexor comprises two or more input multiplexors, wherein the adder carryout bit is coupled to a select signal input of each of the two or more input multiplexors to provide at the output of the compact dual function adder either the increment operation, the decrement operation, or the bypass operation.

11. A compact dual function adder circuit for providing both an addition operation for adding a first input m-bit word to a second input n-bit word, wherein m<n, and an increment operation for incrementing a n-bit word, the dual function adder comprising:

a n-bit incrementer circuit, said n-bit incrementer including:
  a first m-bit incrementer, said first m-bit incrementer generating a first m-bit increment output sum and a first increment carryout bit; and
  a second n–m)-bit incrementer, said n–m)-bit incrementer generating a n–m)-bit increment output sum; and
  an increment multiplexor, the increment multiplexor coupled to the second n–m)-bit incrementer and the input n-bit word to selectively provide a n–m)-bit multiplexed incrementer output word according to a logic state of the first increment carryout bit, the multiplexed output word concatenated to the first m-bit increment sum to provide a n-bit output increment sum; and a combined adder circuit, said combination adder including:
  an m-bit adder circuit to add the input m-bit word to bits<(m–1) ... 0> of the second input n-bit word, the combined adder generates a m-bit adder output sum and an adder carryout bit;
  a (m–n)-bit decrementer, the decrementer receiving bits<(n–1) ... m>of the second input n-bit word to generate a (m–n)-bit decrement output sum; and
  an adder select logic circuit, the adder select logic coupled to receive the n–m)-bit increment output sum, the (m–n)-bit decrement output sum, and bits<(n–1) ... m> of the n-bit second input word, the select logic selectively provides a (n–m)-bit adder output word according to an operation control signal comprising the adder carryout bit and bit<m–1> of the first m-bit input, and the n–m)-bit adder output word concatenated to the first m-bid adder sum to provide a n-bit adder sum.

12. The dual function adder of claim 11 wherein the adder select logic comprises an adder multiplexor, wherein the adder carryout bit is coupled to a select signal of the adder multiplexor to selectively control the adder multiplexor to provide the n–m)-bit adder output word.

13. The dual function adder of claim 11 wherein the adder select logic comprises:
an XOR gate, the XOR gate coupled to receive the adder carryout bit and bit<(m–1>) of the first m-bit input word, the XOR gate generating an operation control signal; and an adder multiplexor, wherein the adder carryout bit and the operation control signal are coupled to a select signal of the adder multiplexor to selectively provide the (n–m)-bit adder output word.

14. The dual function adder of claim 13 wherein the adder multiplexor is a 3-input multiplexor, wherein the adder carryout bit is coupled to a select signal of the 3-input multiplexor to selectively provide the n–m)-bit adder output word.

15. The dual function adder of claim 13 wherein the adder multiplexor comprises two 2-input multiplexors, wherein the adder carryout bit and the bit<(m–1)>of the first m-bit input word is coupled to provide one or more select control the two multiplexors to selectively provide the n–m)-bit adder output word.

16. A compact dual function adder circuit for providing both an addition operation for adding an input 16-bit word to an input 44-bit word, and an increment operation for incrementing a 44-bit word, the dual function adder comprising:

a 44-bit incrementer circuit, said 44-bit incrementer including:
  a first 16-bit incrementer, said first 16-bit incrementer generating a first 16-bit increment output sum and a first increment carryout bit; and
  a second 28-bit incrementer, the 28-bit incrementer generating a 28-bit increment output sum; and
  an increment multiplexor, the increment multiplexor coupled to the second 28-bit incrementer and the input 44-bit word to selectively provide a 28-bit multiplexed incrementer output word according to a logic state of the first increment carryout bit, the multiplexed output word concatenated to the first 16-bit increment sum to provide a 44-bit output increment sum; and a combined adder circuit, said combination adder including:
  a 16-bit adder circuit to add the input 16-bit word to bits<15 ... 0> of the input 44-bit word, the combined adder generates a 16-bit adder output sum and an adder carryout bit;
  a 28-bit decrementer, the decrementer receiving bits<43 ... 16> of the input 44-bit word to generate a 28-bit decrement output sum; and
  an adder select logic circuit, the adder select logic coupled to receive the 28-bit increment output sum, the 28-bit decrement output sum, and bits<43 ... 16> of the 44-bit input word, the select logic selectively provides a 28-bit adder output word according to an operation control signal comprising the adder carryout bit and bit<15>of the 16-bit word input, and the 28bit adder output word concatenated to the first 16-bit adder sum to provide a 44-bit adder sum.

17. The dual function adder of claim 16 wherein the adder select logic comprises an adder multiplexor, wherein the adder carryout bit is coupled to a select signal input of the adder multiplexor to selectively provide at an output of the combined adder the 28-bit adder output word.

18. The dual function adder of claim 16 wherein the adder select logic comprises:
an XOR gate, the XOR gate coupled to receive the adder carryout bit and bit<15>of the 16-bit input word, the XOR gate generating an operation control signal; and
an adder multiplexor, wherein the adder carryout bit and the operation control signal are coupled to a select signal of the adder multiplexor to selectively provide the 28-bit adder output word.

19. The dual function adder of claim 18 wherein the adder multiplexor comprises a 3-input multiplexor, wherein the adder carryout bit is coupled to a select signal of the 3-input multiplexor to selectively provide the 28-bit adder output word.

20. The dual function adder of claim 18 wherein the adder multiplexor comprises two 2-input multiplexors, wherein the adder carryout bit and the operation control signal from the XOR gate are coupled to a select signal input of the two 2-input multiplexors, the multiplexors provide one or more select control to the two multiplexors to selectively provide the 28-bit adder output word.

21. The dual function adder of claim 14, wherein the adder select logic further comprises:

wherein if the bit<15>of the 16-bit input word is equivalent to a logical "0" and the adder carryout bit is equivalent to a logical "0", a bypass operation is selected;

wherein if the bit<15>of the 16-bit input word is equivalent to a logical "0" and the adder carryout bit is equivalent to a logical "1", an increment operation is selected; and wherein if the bit<15>of the 16-bit input word is equivalent to a logical "1" and the adder carryout bit is equivalent to a logical "0", a decrement operation is selected.

* * * * *